(12) United States Patent
Hierrezuelo et al.

(10) Patent No.: US 10,899,553 B2
(45) Date of Patent: Jan. 26, 2021

(54) MOVEABLE ARTICLE RESTRICTION DEVICE

(71) Applicants: Angel F Hierrezuelo, Kenilworth, NJ (US); John Moore, Kenilworth, NJ (US); William Keith Skidmore, Kenilworth, NJ (US)

(72) Inventors: Angel F Hierrezuelo, Kenilworth, NJ (US); John Moore, Kenilworth, NJ (US); William Keith Skidmore, Kenilworth, NJ (US)

(73) Assignee: White Conveyors Inc., Kenilworth, NJ (US)

( * ) Notice: Subject to any disclaimer, the term of this patent is extended or adjusted under 35 U.S.C. 154(b) by 0 days.

(21) Appl. No.: 16/363,765

(22) Filed: Mar. 25, 2019

(65) Prior Publication Data

US 2019/0291970 A1 Sep. 26, 2019

Related U.S. Application Data

(60) Provisional application No. 62/647,018, filed on Mar. 23, 2018.

(51) Int. Cl.
*B65G 47/46* (2006.01)
*B65G 43/08* (2006.01)
*B65G 17/20* (2006.01)
*B65G 21/20* (2006.01)

(52) U.S. Cl.
CPC ......... *B65G 47/46* (2013.01); *B65G 21/2063* (2013.01); *B65G 43/08* (2013.01); *B65G 17/20* (2013.01)

(58) Field of Classification Search
CPC ......... B65G 9/00; B65G 47/46; B65G 17/20; B65G 19/025; B65G 21/2063; B65G 21/2072; B65G 43/08
See application file for complete search history.

(56) References Cited

U.S. PATENT DOCUMENTS

| | | | |
|---|---|---|---|
| 3,283,914 A | 11/1966 | Robinson | |
| 3,868,906 A | 3/1975 | Cameron | |
| 3,921,814 A * | 11/1975 | Solomon | A47F 7/24 211/162 |
| 4,907,699 A * | 3/1990 | Butcher | B07C 5/3412 198/349.95 |
| 5,076,446 A | 12/1991 | Simmerman | |
| 5,441,158 A * | 8/1995 | Skinner | B07C 5/3412 198/370.03 |
| 5,509,572 A * | 4/1996 | Curtis | G07F 7/00 198/411 |
| 5,697,508 A | 12/1997 | Rifkin et al. | |
| 6,578,671 B2 * | 6/2003 | Shen | G06Q 10/0875 186/35 |

(Continued)

*Primary Examiner* — Mark A Deuble
(74) *Attorney, Agent, or Firm* — Gearhart Law LLC

(57) ABSTRACT

Systems, methods, and apparatus are provided for restricting access to articles on a conveyor. The apparatus includes a locking mechanism configured to move via a plurality of actuators, wherein at least two of the actuators move the locking mechanism in differing directions, and also configured to prevent removal of at least one article from the conveyor while in a locking position against the conveyor, wherein at least one of the actuators is configured to move the locking mechanism into the locking position.

29 Claims, 9 Drawing Sheets

(56) References Cited

U.S. PATENT DOCUMENTS

| | | | |
|---|---|---|---|
| 7,277,773 B2 * | 10/2007 | Speckhart | G07F 17/12 |
| | | | 198/349 |
| 7,886,971 B2 * | 2/2011 | Cassady | G06Q 10/06 |
| | | | 235/383 |
| 7,907,699 B2 | 3/2011 | Long et al. | |
| 2002/0066644 A1 | 6/2002 | Hierrezuelo et al. | |
| 2018/0346242 A1 * | 12/2018 | Grosse | B65G 1/0457 |

* cited by examiner

MOVEABLE ARTICLE RESTRICTION DEVICE

CLAIM OF PRIORITY

This application is a United States non-provisional application and claims priority to U.S. Provisional Patent Application No. 62/647,018, filed Mar. 23, 2018, herein incorporated by reference in its entirety.

FIELD OF THE EMBODIMENTS

This invention and the embodiments relate to the secure storage of articles and, in particular, to selectively preventing articles from removal from a conveyor.

BACKGROUND OF THE EMBODIMENTS

Article retrieval is used in many industries; particularly industries that require the deposit and removal of articles of clothing, such as industries that require employees to drop off and pick up uniforms.

If a worker is present, the work can ensure that, when an individual picks up his/her articles, those are the only articles that are retrieved. Training and paying the worker can be a significant expense for a company. However, if the workers were to go away, nothing would prevent the individuals from taking articles that they are not authorized to take. Therefore, an unattended system is needed whereby individuals are prevented from removing articles that they are not authorized to remove.

Systems to secure articles to a conveyor have been known, but they require a reconfiguration of the slots on a conveyor. In addition, such systems to secure articles on a conveyor are configured more to support articles on a hanging conveyor and prevent the articles from dropping out of the slots, rather than to utilize an automated device to effectively prevent individuals from removing the articles from the slots.

Examples of related art are described below:

U.S. Pat. No. 7,907,699 relates to improved methods and apparatus for sorting and arranging garments in a selected order which have been sequentially placed in an unordered sequence. The garments are identified by a marking affixed to each garment, and each garment is arranged in its identified sequence on a sorting conveyor having a multiplicity of movable carriers each for receiving a garment. Identification signals are rearranged in a preselected order, and a plurality of arranged signals are assigned to each one of a corresponding plurality of pick-off mechanisms positioned along the sorting conveyor. A computer calculates bidirectional movement of the sorting conveyor to minimize conveyor movement for positioning a garment for pick-off in its proper sequence by a respective one of the pick-off mechanisms. The conveyor is driven in a bidirectional mode to properly position the garment, and a pick-off mechanism is activated to remove the garment from the sorting conveyor and position the garment on an unloading conveyor. Each conveyor pick-off apparatus includes a fluid-powered cylinder inclined downward toward the sorting conveyor, and a drive unit for closing the gripper mechanism. The method and apparatus of the present invention are particularly well suited for commercial laundry and industrial uniform rental plant industry, wherein commingled garments are arranged in a selected order for pickup or delivery to customers.

U.S. Pat. No. 5,697,508 relates to a trolley and bag assembly adapted to transport hanger-hung garments on overhead rails from an initial point to other points, the bag protectively shrouding the transported garments. The trolley includes a pair of rolling sheaves that ride on the rails and a spaced pair of side arms depending from the sheaves to support a horizontal load bar onto which is hooked a set of hanger-hung garments. Bridging the side arms is a retractable hold-down bar which when raised above the load bar then permits the hangers to be hooked onto the load bar, and when lowered then clamps the hooks of the hangers so that the garments cannot be dislodged from the trolley.

U.S. Pat. No. 3,283,914 relates to a bar-type trolley arrangement for carrying a plurality of hanging articles along a conveyor rail structure.

U.S. Pat. No. 3,868,906 relates to a caddy for garment hangers which includes a tube, a retainer strip coextensive therewith and latch members which connect the tube and the strip to permit broadwise movement of the strip between an overlying clamping position in which the hooks of the garment hangers are clamped to the tube and a captive retracted position in which the strip is spaced parallel to the tube. The retainer strip is sufficiently weighty so that when the caddy is freely supported in horizontal position, the strip swings down into a pendulous out-of-the-way position clear of the hooks. In a preferred form of latch member the active latch portion is integrally formed by reversely bending the end of the member, with the tip thereof forming a latching surface which engages the wall of the tube but which may be manually released by finger pressure. The invention has method aspects including the steps of supporting the caddy horizontally at a garment unpacking station in the retracted and pendulous state for dispensing of the hangers one by one, transporting the garments and empty caddy to a place of sale, supporting the caddy horizontally at the place of sale with the caddy in the retracted and pendulous state for depositing of hangers thereon one by one as they are removed from sold garments, snapping the filled caddy into locked condition, and then returning the caddy to the place of original support for storage and dispensing of the hangers so that the hangers are at all times either (a) in a garment or (b) organized on a caddy.

U.S. Pat. No. 5,076,446 relates to a hanger caddy transporter that includes a rectangular frame and two hooks for coupling the transporter to a trolley. A pair of slidable blocking members move between an upper position to retain the hooks on the trolley and a lower position to release the hooks from the trolley. The hooks are adjustably mounted on the transporter to allow the separation between the hooks to be adjusted as desired.

U.S. Patent Application Publication No. 2002/0066644 relates to a locking apparatus configured to restrict access to articles on a conveyor, such as hooked members, by having a locking piece which, when mounted adjacent to a portion of the conveyor and moved to an extended position, the locking piece rests against the articles and conveyor, thereby preventing an operator from removing the articles from the conveyor. The movement of the locking piece can be automated by coupling each locking piece to an actuator which moves the locking piece to the extended position, and coupling each actuator to an air solenoid unit controlled by a computer system. A series of locking pieces used together selectively restrict access to articles suspended only from certain slots within a frame on the conveyor. The series of locking pieces creates an automated locking system for unattended access of garments on a conveyor by being used on a conveyor placed inside a locked area and by being used in conjunction with an operator interface, a computer system and a selectively locking panel exposing a frontal frame on the conveyor path when opened.

None of the art described above addresses all of the issues that the embodiments of the present invention do.

SUMMARY OF THE EMBODIMENTS

According to an embodiment of the present invention, an apparatus is provided for restricting access to articles on a conveyor. The apparatus includes a locking mechanism configured to move via a plurality of actuators, wherein at least two of the actuators move the locking mechanism in differing directions, and prevent removal of at least one article from the conveyor while in a locking position against the conveyor, wherein at least one of the actuators is configured to move the locking mechanism into the locking position.

According to another embodiment of the present invention, an automated locking system is provided for restricting access to articles. The automated locking system includes a conveyor configured to store a plurality of articles, each article being stored in an individual slot on the conveyor. The automated locking system further includes a locking mechanism configured to move via a plurality of actuators, wherein at least two of the actuators move the locking mechanism in differing directions, and prevent removal of at least one article from the conveyor while in a locking position against the conveyor, wherein at least one of the actuators is configured to move the locking mechanism into the locking position.

According to yet another embodiment of the present invention, a method is provided for restricting access to articles on a conveyor. The method includes identifying one or more articles for removal from a conveyor, determining a location of each of the one or more articles for removal, identifying one or more articles to be secured on the conveyor, and determining a location of each of the one or more articles to be secured. The method further includes positioning a locking mechanism in a locking position over the one or more articles for removal and the one or more articles to be secured such that the one or more articles for removal are freely removable and the one or more articles to be secured are locked onto the conveyor, wherein the locking mechanism moves via a plurality of actuators, and wherein at least two of the actuators move the locking mechanism in differing directions.

It is an object of the present invention to provide for an apparatus wherein at least one of the actuators pivot the locking mechanism around an axis into the locking position.

It is an object of the present invention to provide for an apparatus wherein at least one of the actuators moves the locking mechanism in a straight path.

It is an object of the present invention to provide for an apparatus wherein the locking mechanism includes one or more openings configured to enable one or more articles to be removed from the conveyor.

It is an object of the present invention to provide for an apparatus that includes a door configured to grant a user access to one or more articles on the conveyor and wherein the door has a locking mechanism.

It is an object of the present invention to provide for an apparatus wherein the door locking mechanism is configured to lock the door closed after successful removed of a predetermined number of articles from the conveyor.

It is an object of the present invention to provide for an apparatus wherein the locking mechanism is further configured to prevent insertion of any articles onto the conveyor.

It is an object of the present invention to provide for an apparatus that includes a sensing mechanism configured to enable the apparatus to determine a location of one or more articles to be removed.

It is an object of the present invention to provide for an apparatus wherein the plurality of actuators are configured to position the locking mechanism such that the one or more articles to be removed are removable and all other articles are locked onto the conveyor.

It is an object of the present invention to provide for an apparatus wherein the apparatus is coupled to the conveyor.

It is an object of the present invention to provide for a system which includes an identification reader configured to identify one or more articles for removal from the conveyor.

It is an object of the present invention to provide for an apparatus, wherein the actuator is positioned on top of the conveyor.

DESCRIPTION OF THE PREFERRED EMBODIMENTS

Figure 1:
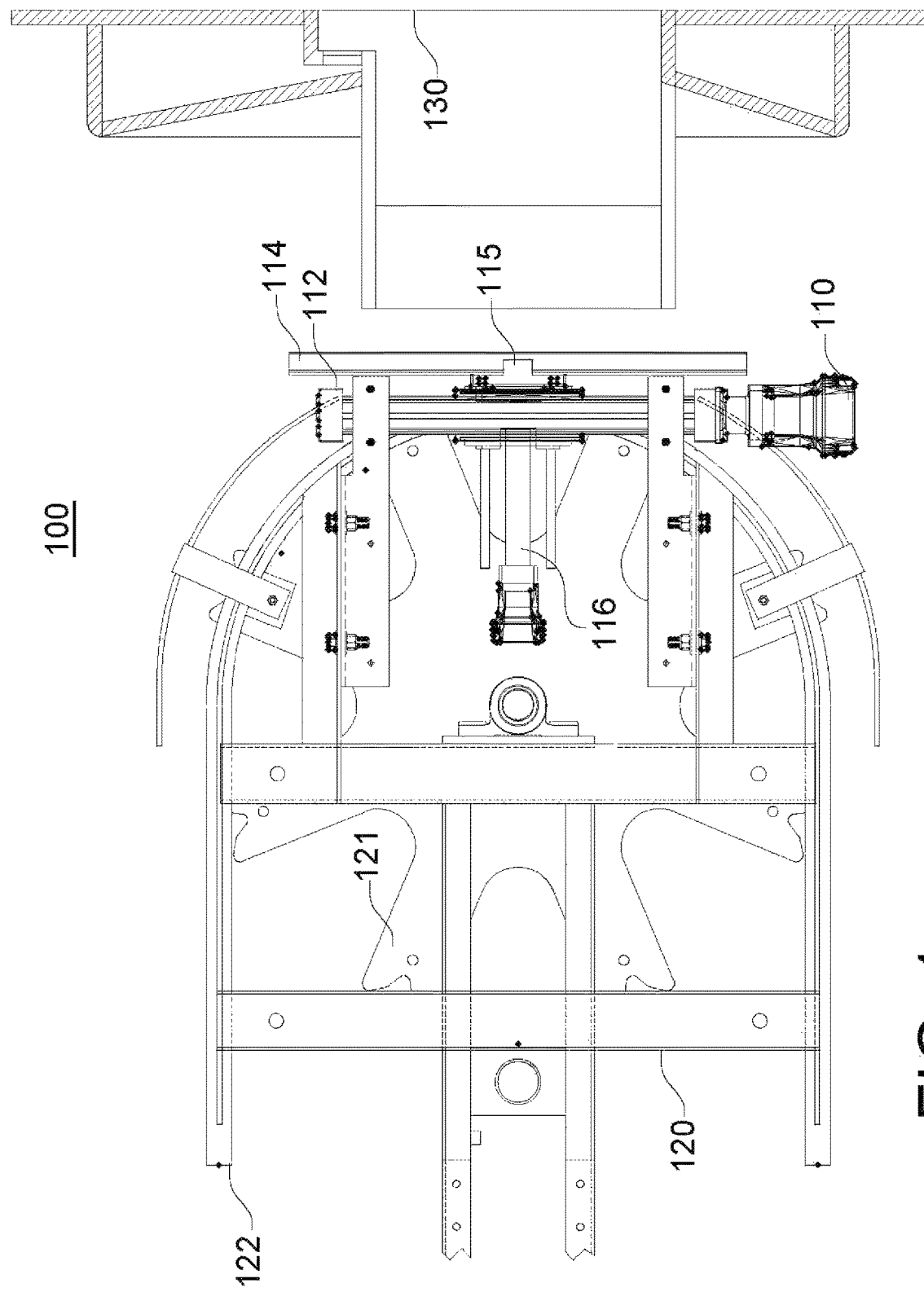
FIG. 1 shows a top view of an automated locking system, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
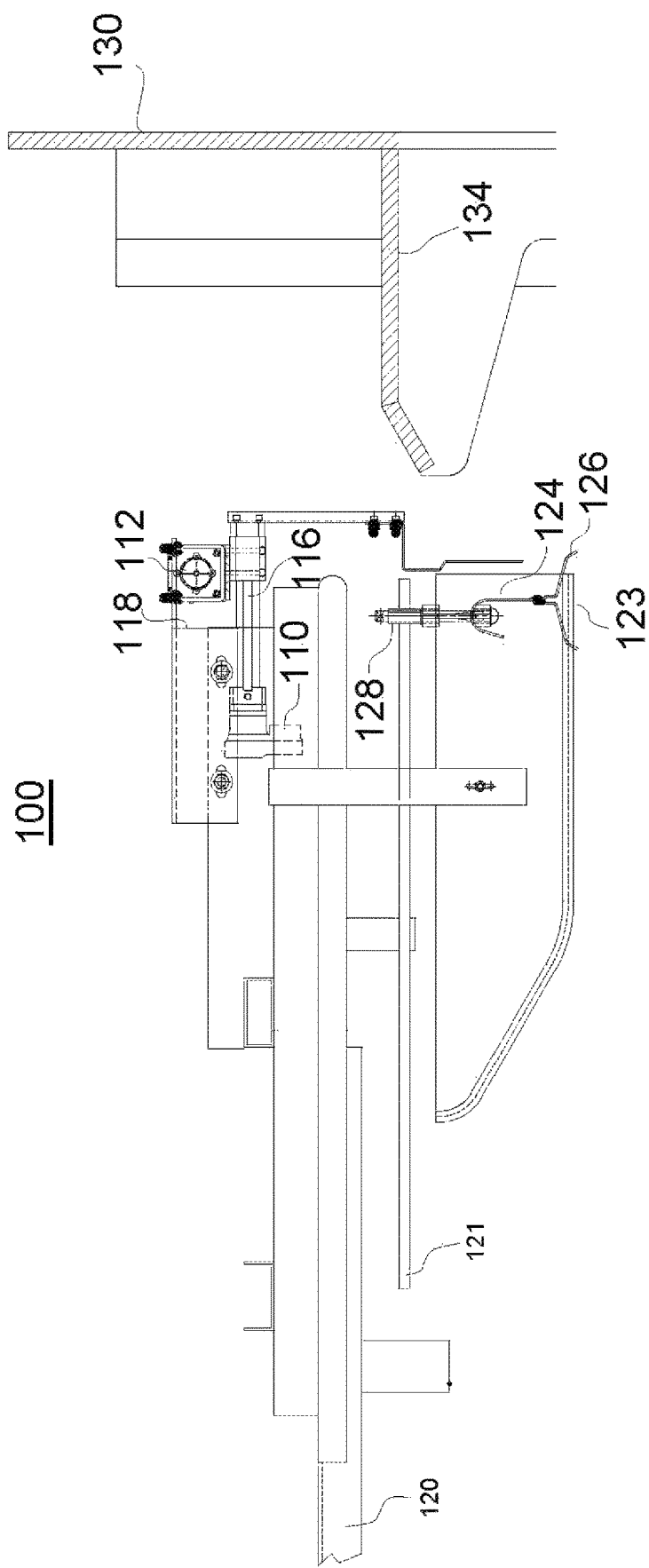
FIG. 2 shows a side view of an automated locking system, according to an embodiment of the present invention.

Referring now to FIGS. 1 and 2, a top view (FIG. 1) and a side view (FIG. 2) of an automated locking system 100 are illustratively depicted, in accordance with an embodiment of the present invention.

As shown in FIGS. 1 and 2, the system 100 includes a locking mechanism 110, a conveyor mechanism 120, and a door mechanism 130.

According to embodiments shown in FIGS. 1 and 2, the present invention provides for a system 100 that includes a locking mechanism 110 for restricting access to articles on a conveyor mechanism 120, such as hangers 126, having hooked members 124, supporting garments 123 thereon. According to the embodiment shown in FIGS. 1 and 2, the conveyor mechanism 120 includes a rotating mechanism 121 configured to move one or more garments 123 along a conveyor 122. It should be noted, however, that other forms of conveyor systems 120 may also be used with system 100, while maintaining the spirit of the present invention.

The locking mechanism 110 in the present invention can be made part of an unattended article access system 100 by providing restricted access to garments 123 on a conveyor mechanism 120 without requiring individual locking mechanisms on all slots 128 on the conveyor 122 and without requiring extra space to separate or otherwise isolate garments 123 from the rest of the conveyor system 120. The elimination of both the individual locking mechanisms and a worker to ensure that the correct garments 123 are removed from the system 100 decreases cost and complexity.

According to embodiments shown in FIGS. 1 and 2, the conveyor mechanism 120 is configured to suspend and transport garments 123 housed on slots 128 on the conveyor 122. The conveyor 122 may be made up of a continuous chain of linked slots, a continuous chain of linked frames with each frame containing a number of slots 128, or may be any another suitable conveyor 122.

The locking mechanism 110 may be mounted and moveable using a plurality of motors, such as, e.g., actuators. According to an embodiment, the actuators include a piston such as, e.g., a linear acting piston. A piston can be movably mounted within an actuator. A free end of the piston may be coupled to a locking piece 114 and the movement of the piston drives the movement of the locking piece 114. According to an embodiment, the actuator is mounted on top of the conveyor. It is noted, however, that the actuator may be mounted at any suitable angle to the conveyor, while maintaining the spirit of the present invention.

According to an embodiment, the mechanism may be connected to and controlled by a controller. The mechanism unit may include one or more units, each unit being connected to a separate actuator. The actuator unit can have an x- and y-axis.

In the example shown in FIGS. 1 and 2, the locking mechanism 110 is shown to move the locking piece 114 in a straight path along a first path 112 and a second path 116. The locking mechanism 110 may be coupled to the conveyor mechanism 120 via a suitable coupling apparatus 118. The locking mechanism 110 may also be mounted to a fixed frame independent of the conveyor mechanism 120.

According to an embodiment, the conveyor mechanism 120 is contained in a secure area such as a locked room, and only a portion of the conveyor can be accessed by an operator from the outside via a selectively locking panel, door, or window 132 (shown in FIG. 9), of the door mechanism 130, at an article access station. The portion of the conveyor 122 accessible by the operator may be, for example, the frontal frame of a U-shaped turn (as shown in FIG. 1) in the path of the conveyor 122. The movement of the conveyor 122. According to an embodiment, the locking panel, door, or window 132 is a passive locking panel, door, or window that may, when unlocked, freely open and passively close due to, e.g., its own weight, a weighted object, a spring, or any other suitable method of passively closing locking panel, door, or window 132. According to an embodiment, an upper wall 134 blocks user access to the locking mechanism 110.

According to an embodiment, an operator inputs information using an identification reader, such as, e.g., a card reader, a keypad, fingerprint scan, or any other suitable form of identification reader. The information indicates which garment or garments 123 on the conveyor 122 are to be removed by the operator. The system 100 this locates the garment or garments 123. According to an embodiment, the locking mechanism 110 may be controlled by a computer as a function of the identification entered to determine the location of the garment or garments 123.

According to an embodiment, the locking mechanism 110 includes a locking piece 114. Once the garment or garments 123 to be removed have been identified all other garments 123 are identified as not to be removed. According to an embodiment, the locking mechanism 110 moves along its multiple movable paths (112, 116) such that the locking piece 114 is secured, in a locking position, against the conveyor 122, with an opening 115 in the locking piece 114 located at the location of the garment or garments 123 to be removed from the conveyor 122. Once the locking piece 114 is secured against the conveyor 122, the garment or garments 123 to be removed from the conveyor 122 are freely removable, while all other garments 123 are secured on the conveyor 122 due to the locking piece's 114 coupling to the conveyor 122. According to an embodiment, the coupling of the locking piece 114 against the conveyor 122 also prevents any garments 123 from being placed onto the conveyor 122. According to an embodiment, the locking piece 114 includes a plurality of openings 115. The shape and size of the locking piece 114 may vary according to the number of slots 128 that the locking piece 114 is configured to control.

According to an embodiment, the door mechanism 130 unlocks to enable an operator to remove a garment or garments 123 from the conveyor 122 and locks once the article or garments 123 are successfully removed. The door mechanism 130 may also include an upper cover portion 134 designed to prevent an operator from gaining access to the locking mechanism 110.

The control of the locking piece 114 to restrict an operator's access to an assigned slot 128 on the conveyor 122 and the unlocking of the door mechanism 130 may all be controlled by a computer system as a function of the identification information entered by the operator at the identification reader outside of the secure area, such as, e.g., a magnetic card reader on an outside wall of the locked room.

Figure 3:
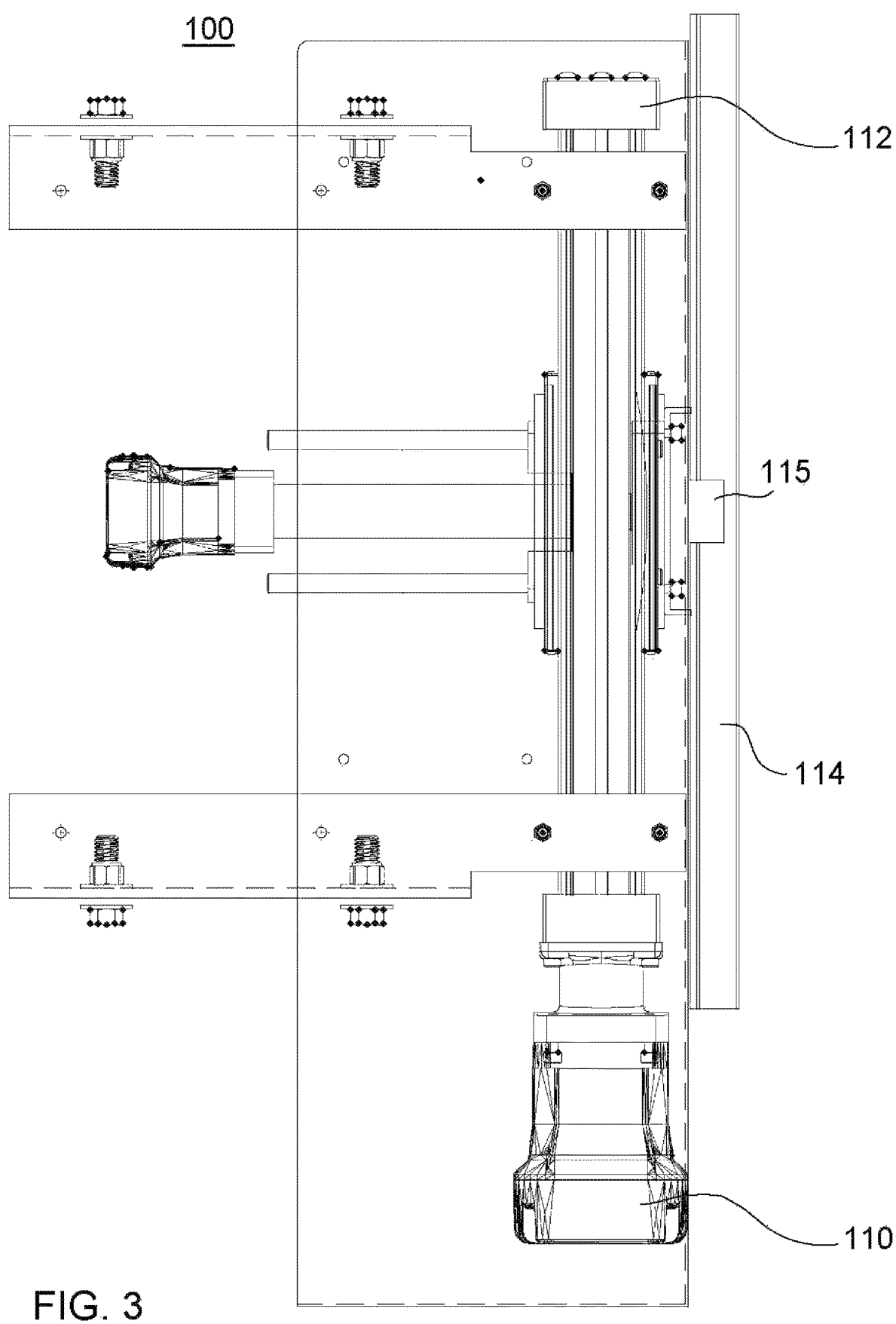
FIG. 3 shows a top view an automated locking mechanism, according to an embodiment of the present invention.
Figure 4:
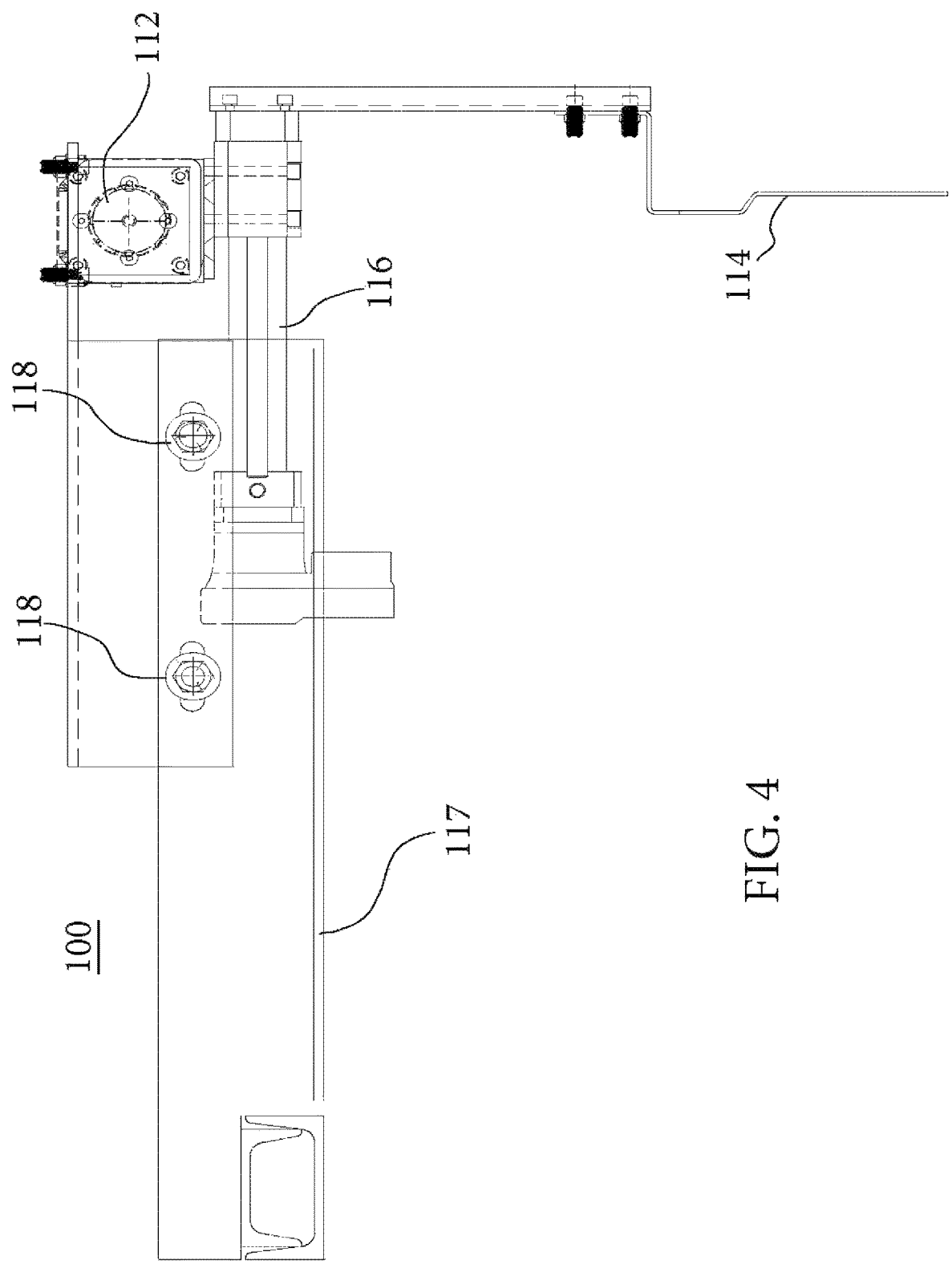
FIG. 4 shows a side view of an automated locking mechanism, according to an embodiment of the present invention.

Referring now to FIGS. 3 and 4, a top view (FIG. 3) and a side view (FIG. 4) of the automated locking mechanism 110 are illustratively depicted, in accordance with an embodiment of the present invention.

According to the embodiments shown in FIGS. 3 and 4, a portion of the locking mechanism 110 is housed within a cover portion 117. The cover portion 117 aids in the prevention of damage to the components of the locking mechanism housed within the cover portion 117.

According to an embodiment, the locking piece 114 is located outside of the cover portion 117 so that, when engaged in the locking position, the locking piece can successfully become engaged with the conveyor 122.

Figure 5:
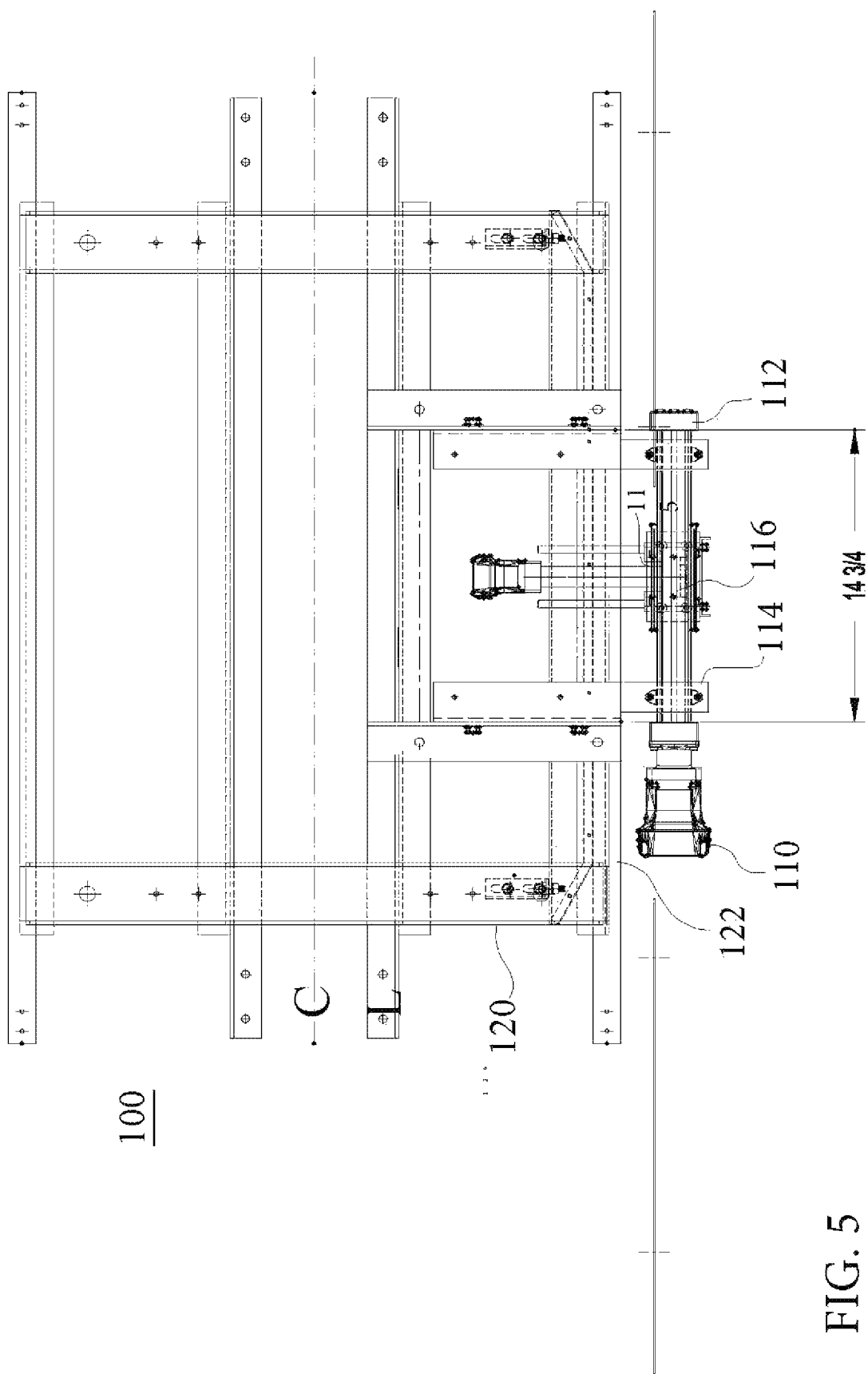
FIG. 5 shows a top view of an automated locking system, according to an embodiment of the present invention.
Figure 6:
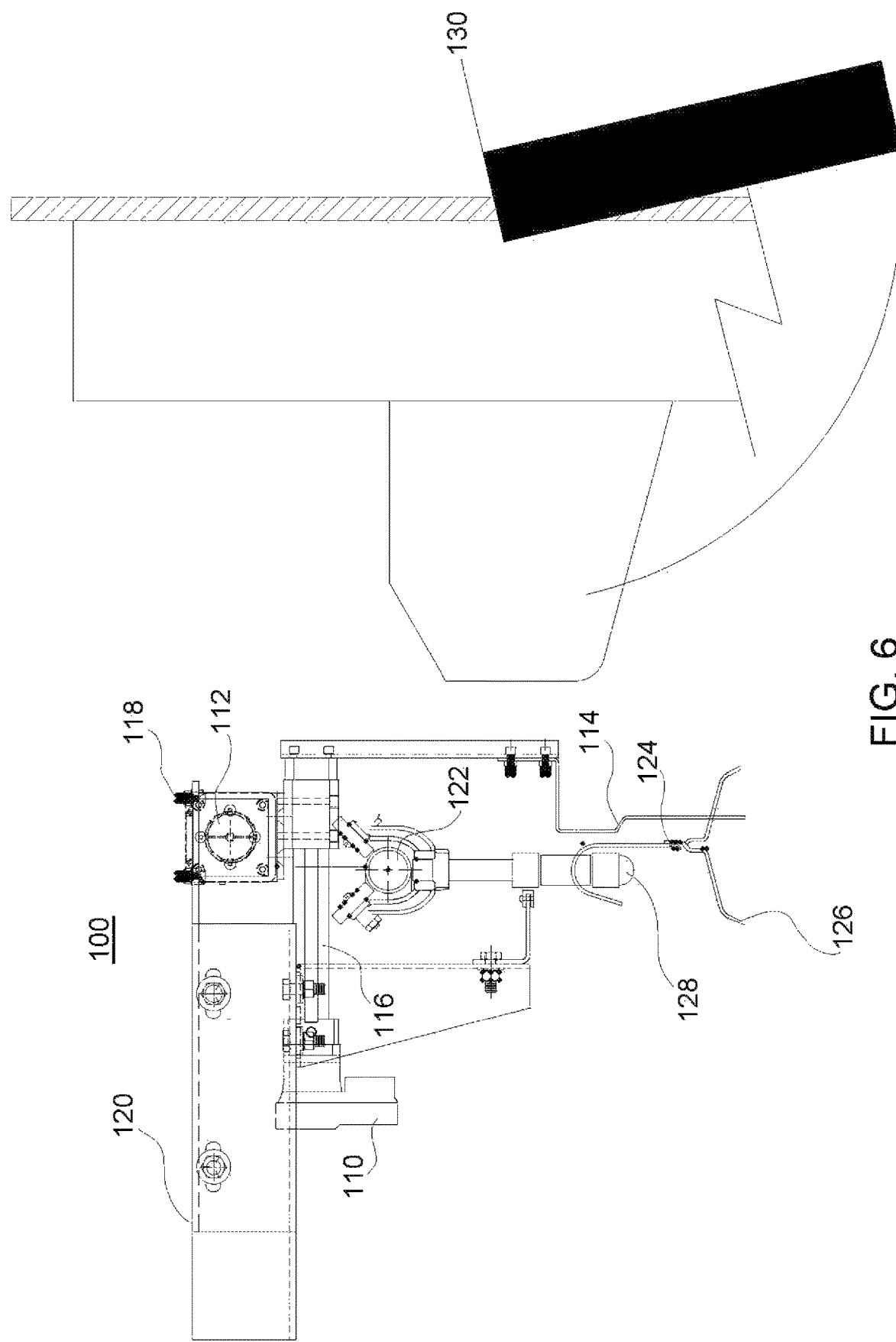
FIG. 6 shows a side view of an automated locking system, according to an embodiment of the present invention.

Referring now to FIGS. 5 and 6, a top view (FIG. 5) and a side view (FIG. 6) of an automated locking system 100 are illustratively depicted, in accordance with an embodiment of the present invention.

According to the embodiments shown in FIGS. 5 and 6, the conveyor mechanism 120 includes a horizontal portion accessible by the operator.

According to an embodiment, the locking piece 114 is designed such that the portion of the locking piece 114 that comes into contact with the conveyor 122 is of the same approximate shape as the conveyor 122. As shown in the embodiment of FIGS. 5 and 6, the shape of the locking piece 114 is complimentary to the shape of the conveyor 122.

Figure 7:
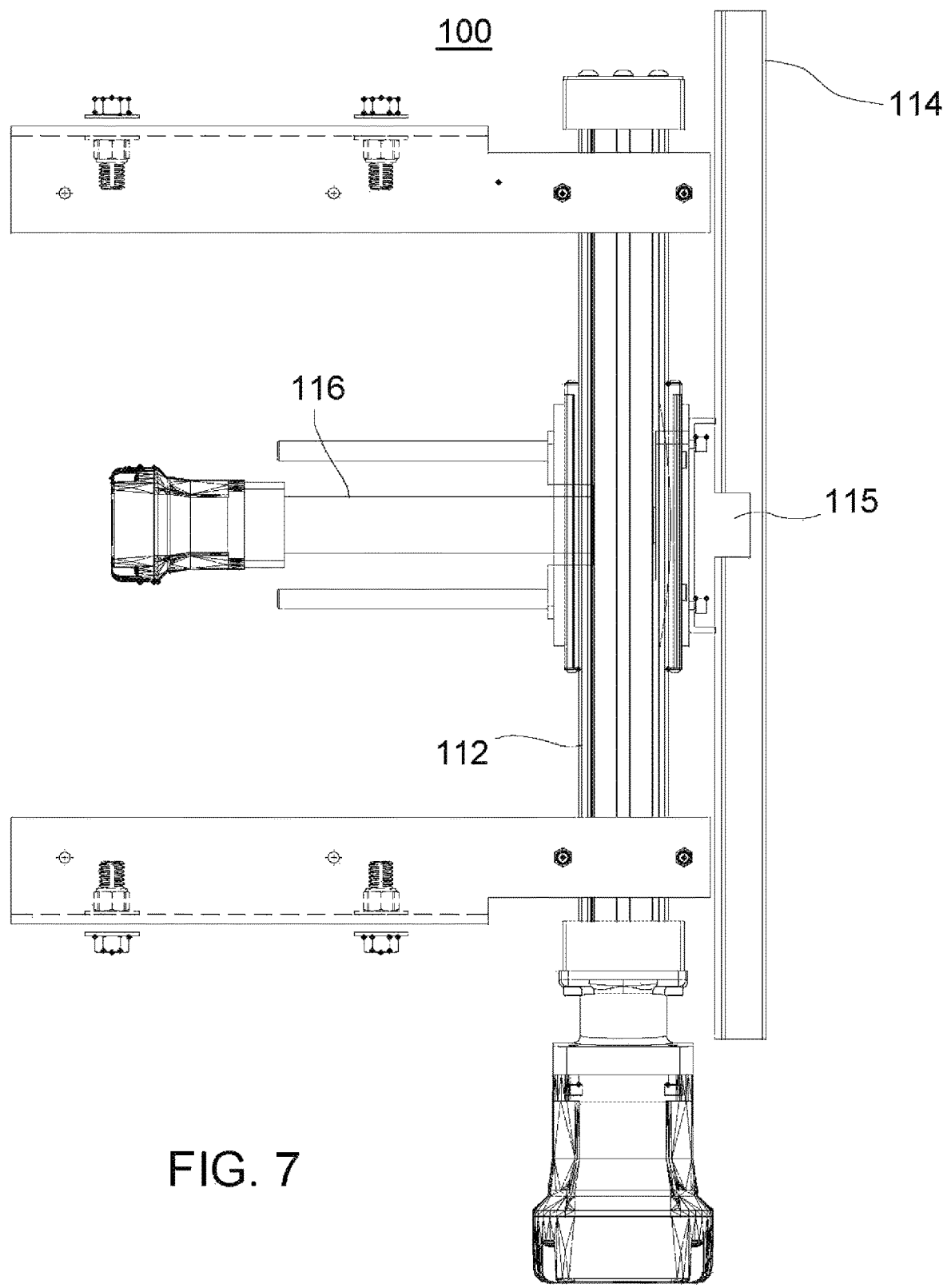
FIG. 7 shows a top view of an automated locking mechanism, according to an embodiment of the present invention.
Figure 8:
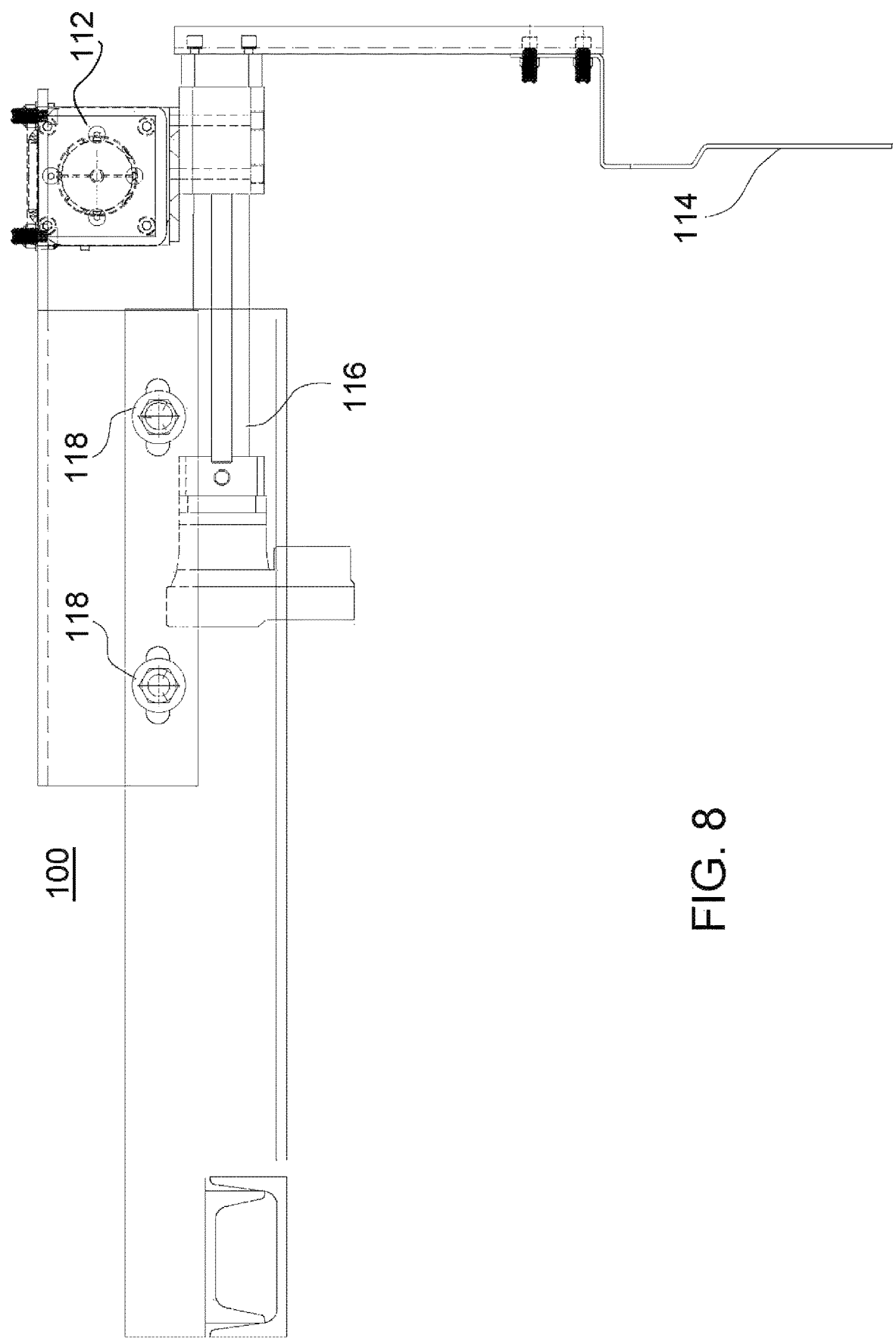
FIG. 8 shows a side view of an automated locking mechanism, according to an embodiment of the present invention.

Referring now to FIGS. 7 and 8, a top view (FIG. 7) and a side view (FIG. 8) of the automated locking mechanism 110 are illustratively depicted, in accordance with an embodiment of the present invention.

According to the embodiments shown in FIGS. 3 and 4, the cover portion 117 shown in FIGS. 3 and 4 is not present.

Figure 9:
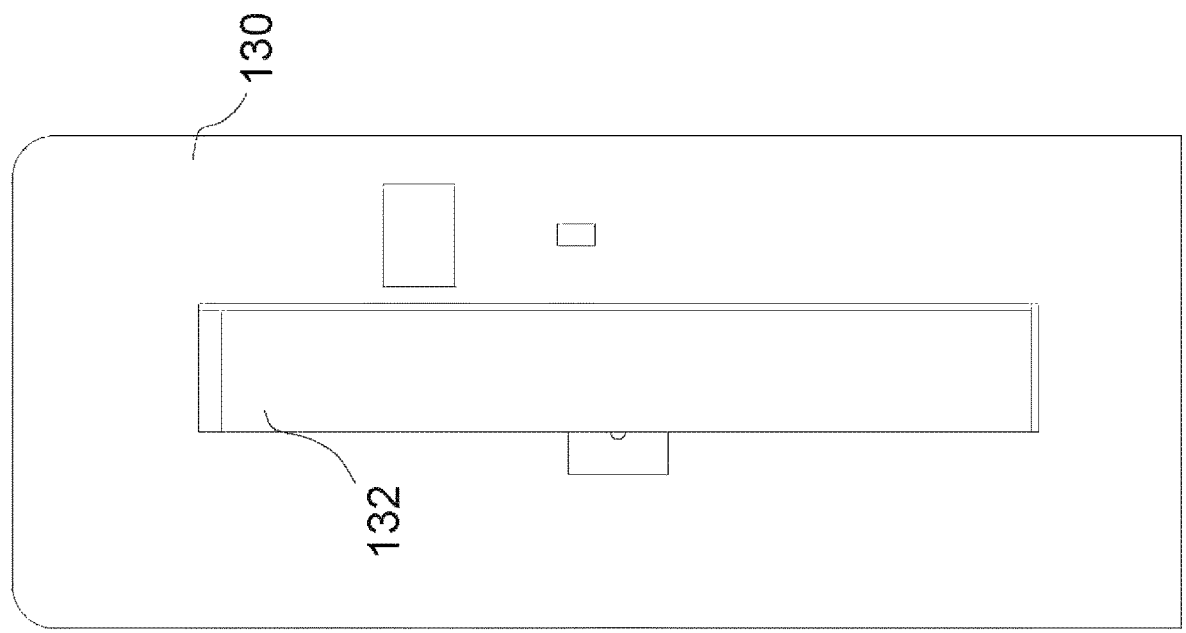
FIG. 9 shows a side view and a front view of an automated locking system, according to an embodiment of the present invention.
Figure 9:
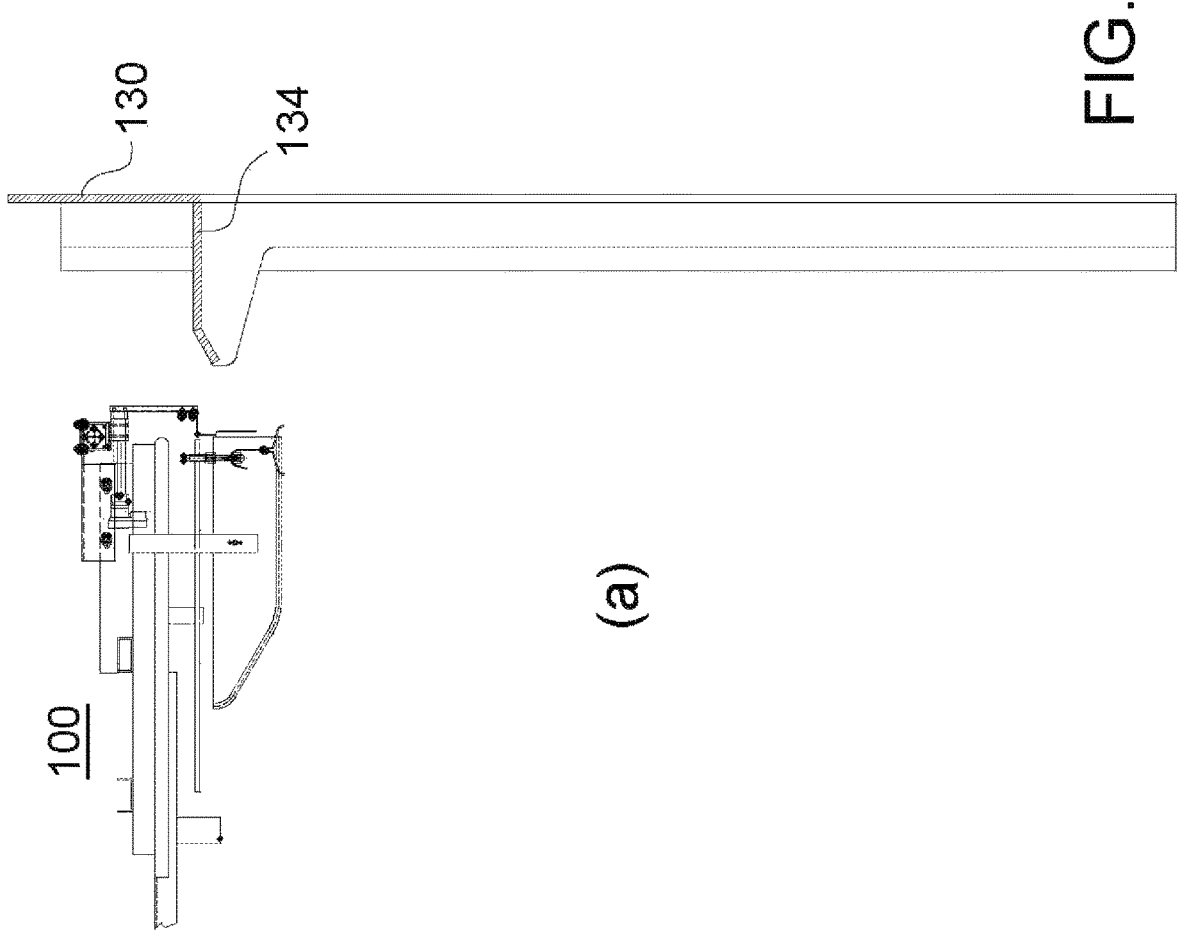

Referring now to FIG. 9, a side view (FIG. 9(a)) and a front view (FIG. 9(b)) of the automated locking system 100 is illustratively depicted, in accordance with an embodiment of the present invention.

According to the embodiments shown in FIGS. 9(a) and 9(b), the conveyor mechanism 120 is contained in a secure area such as a locked room, and only a portion of the conveyor can be accessed by an operator from the outside via a selectively locking panel, door, or window 132, of the door mechanism 130, at an article access station. The portion of the conveyor 122 accessible by the operator may be, for example, the frontal frame of a U-shaped turn (as shown in FIG. 1) in the path of the conveyor 122. The movement of the conveyor 122. According to an embodiment, the locking panel, door, or window 132 is a passive locking panel, door, or window that may, when unlocked, freely open and passively close due to, e.g., its own weight, a weighted object, a spring, or any other suitable method of passively closing locking panel, door, or window 132.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An apparatus for restricting access to articles on a conveyor, comprising:
    a locking mechanism having a locking piece with an opening,
    wherein the locking mechanism is configured to move via a plurality of motorized actuators along a first path and a second path,
        wherein the first path includes a first direction and the second path includes a second direction where the first direction and the second direction are different directions,
    wherein the locking piece engages the conveyor to prevent removal of at least one article from the conveyor while in a locking position against the conveyor,
    wherein the opening of the locking piece allows removal of at least one article from the conveyor while in the locking position against the conveyor, and
    wherein at least one actuator of the plurality of motorized actuators is configured to move the locking mechanism into the locking position.

2. The apparatus as recited in claim 1, wherein the locking mechanism pivots around an axis into the locking position.

3. The apparatus as recited in claim 1, wherein at least one of the motorized actuators moves the locking mechanism in a straight path.

4. The apparatus as recited in claim 1, wherein the apparatus further comprises:
    a door configured to grant a user access to one or more articles on the conveyor.

5. The apparatus as recited in claim 4, wherein the door has a locking mechanism.

6. The apparatus as recited in claim 5, wherein the door locking mechanism is configured to lock the door closed after successful removed of a predetermined number of articles from the conveyor.

7. The apparatus as recited in claim 1, wherein the locking mechanism is further configured to prevent insertion of any articles onto the conveyor.

8. The apparatus as recited in claim 1, wherein the plurality of motorized actuators are configured to position the locking mechanism such that the one or more articles to be removed are removable and all other articles are locked onto the conveyor.

9. The apparatus as recited in claim 1, wherein the apparatus is coupled to the conveyor.

10. The apparatus as recited in claim 1, wherein the articles are coupled to the conveyor using one or more hangers.

11. The apparatus as recited in claim 1, wherein the motorized actuator is positioned on top of the conveyor.

12. An automated locking system for restricting access to articles, comprising:
    a conveyor configured to store a plurality of articles, each article being stored in an individual slot on the conveyor; and
    a locking mechanism having a locking piece with an opening, the locking mechanism configured to move via a plurality of motorized actuators,
    wherein at least two actuators of the plurality of motorized actuators move the locking mechanism in differing directions along a first path and a second path,
    wherein the locking piece engages the conveyor to prevent removal of at least one article from the conveyor while in a locking position against the conveyor,
    wherein the opening of the locking piece allows removal of at least one article from the conveyor while in the locking position against the conveyor, and
    wherein at least one actuator of the plurality of motorized actuators is configured to move the locking mechanism into the locking position.

13. The system as recited in claim 12, wherein the locking mechanism pivots around an axis into the locking position.

14. The system as recited in claim 12, wherein at least one of the motorized actuators moves the locking mechanism in a straight path.

15. The system as recited in claim 12, wherein the system further comprises:
    a door configured to grant a user access to one or more articles on the conveyor.

16. The system as recited in claim 15, wherein the door has a locking mechanism.

17. The system as recited in claim 16, wherein the door locking mechanism is configured to lock the door closed after successful removed of a predetermined number of articles from the conveyor.

18. The system as recited in claim 12, wherein the locking mechanism is further configured to prevent insertion of any articles onto the conveyor.

19. The system as recited in claim 12, further comprising a sensing mechanism configured to enable the apparatus to determine a location of one or more articles to be removed.

20. The system as recited in claim 19, wherein the plurality of motorized actuators are configured to position the locking mechanism such that the one or more articles to be removed are removable and all other articles are locked onto the conveyor.

21. The system as recited in claim 12, wherein the the articles are coupled to the conveyor.

22. The system as recited in claim 12, wherein the articles are coupled to the conveyor using one or more hangers.

23. A method for restricting access to articles on a conveyor, comprising:
   identifying one or more articles for removal from a conveyor;
   determining a location of each of the one or more articles for removal;
   identifying one or more articles to be secured on the conveyor;
   determining a location of each of the one or more articles to be secured; and
   positioning a locking mechanism having a locking piece in a locking position over the one or more articles for removal and the one or more articles to be secured such that the one or more articles for removal are freely removable and the one or more articles to be secured are locked onto the conveyor,
      wherein the locking mechanism moves via a plurality of motorized actuators,
      wherein at least two actuators of the plurality of motorized actuators move the locking mechanism in differing directions along a first path and a second path, and
      wherein an opening of the locking piece allows removal of at least one article from the conveyor while in the locking position against the conveyor.

24. The method as recited in claim 23, wherein the locking mechanism pivots around an axis into the locking position.

25. The method as recited in claim 23, wherein at least one of the motorized actuators moves the locking mechanism in a straight path.

26. The method as recited in claim 23, wherein the locking mechanism includes one or more openings configured to enable one or more articles to be removed from the conveyor.

27. The method as recited in claim 23, further comprising:
   unlocking a lockable door to enable a user to remove a predetermined number of articles from the conveyor.

28. The method as recited in claim 27, further comprising:
   locking the lockable door in a closed position after successful removed of the predetermined number of articles from the conveyor.

29. The method as recited in claim 23, wherein the locking mechanism is further configured to prevent insertion of any articles onto the conveyor.

* * * * *